United States Patent
Nesvadba et al.

(10) Patent No.: US 7,368,525 B2
(45) Date of Patent: May 6, 2008

(54) POLYMERIC ALKOYAMINES PREPARED BY ATOM TRANSFER RADICAL ADDITION (ATRA)

(75) Inventors: Peter Nesvadba, Marly (CH); Lucienne Bugnon, Pfeffingen (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 408 days.

(21) Appl. No.: 10/526,693

(22) PCT Filed: Sep. 16, 2003

(86) PCT No.: PCT/EP03/10272

§ 371 (c)(1),
(2), (4) Date: Mar. 3, 2005

(87) PCT Pub. No.: WO2004/026915

PCT Pub. Date: Apr. 1, 2004

(65) Prior Publication Data
US 2005/0250884 A1    Nov. 10, 2005

(30) Foreign Application Priority Data
Sep. 23, 2002    (EP) ................... 02405823

(51) Int. Cl.
C08G 73/56    (2006.01)
C08K 5/34     (2006.01)
C08K 15/00    (2006.01)
C08F 4/00     (2006.01)
C08F 4/40     (2006.01)

(52) U.S. Cl. ............... 528/423; 528/424; 528/425; 528/486; 528/490; 528/492; 528/503; 524/99; 252/397

(58) Field of Classification Search .......... 528/423, 528/424, 425, 486, 490, 492, 503; 524/99; 252/397
See application file for complete search history.

(56) References Cited

U.S. PATENT DOCUMENTS 5,498,679 A  *  3/1996  Moffat et al. ............. 526/204

FOREIGN PATENT DOCUMENTS

| WO | WO0061544 | * | 10/2000 |
| WO | WO0071501 | * | 11/2000 |
| WO | WO0238618 | * | 5/2002 |

OTHER PUBLICATIONS

Pastor et al; Transition metal catalyzed—alkoxyamines and compositions, 2002, Ciba Speciality Chemicals holding Inc., Switz., Chem abstract 137: 295596.*
Couturier et al; Method for preparing alkoxyamines from nitroxides; 2002, Atofina, France., Chem abstract 136;169419.*
Couturier et al; Method for preparing alkoxyamines from nitroxides; 2000; Elf Atochem S. A., Fr., Chem abstract 133:309685.*

* cited by examiner

Primary Examiner—Duc Truong
(74) Attorney, Agent, or Firm—Tyler A. Stevenson

(57) ABSTRACT

The instant invention pertains to polymeric alkoxyamines, which are prepared by atom transfer radical addition polymerization (ATRA). Further aspects of the invention are a process for their preparation and their use as light stabilizers, flame retardants and polymerization regulators/initiators in controlled radical polymerization processes. Yet another aspect of the invention are novel monomeric intermediate alkoxyamines, which are also useful as polymerization regulators/initiators.

14 Claims, No Drawings

POLYMERIC ALKOYAMINES PREPARED BY ATOM TRANSFER RADICAL ADDITION (ATRA)

The instant invention pertains to polymeric alkoxyamines, prepared by a new method which is frequently called atom transfer radical addition polymerization (ATRA). Further aspects of the invention are a process for their preparation and their use as light stabilizers, flame retardants and polymerization regulators/initiators in controlled radical polymerization processes. Yet another aspect of the invention are novel monomeric intermediate alkoxyamines, which are also useful as polymerization regulators/initiators.

Alkoxyamines or nitroxylethers have been widely suggested in the prior art for different uses. U.S. Pat. No. 4,581,429 describes for the first time the use of alkoxyamines for controlled radical polymerization. U.S. Pat. No. 4,921,962 describes 1-alkoxy-tetramethylpiperidine derivatives as versatile light stabilizers for natural and synthetic polymers. U.S. Pat. Nos. 5,393,812 and 5,844,026 disclose the use of 1-alkoxy-tetramethylpiperidine derivatives as flame retardants in polymers.

The preparation of alkoxyamines has been described in a variety of publications. In Macromol. Rapid Commun. 17, 149-154 (1996) the alkylation of the deprotonated hydroxylamine is described. Another method is the addition of free radicals to nitrone or nitroso compounds as described for example in J. Chem. Soc. 1920 (1954). The free radicals can be produced from a variety of radical sources as described in "Radicals in Organic Synthesis", Wiley-VCH, 2001 or in WO 2001/092228.

In Chem. Rev. 2001, 101, 3661 a summary of the available preparation methods is described.

A recent method for the preparation of monomeric alkoxyamines is based on "Atom Transfer Radical Addition" (ATRA) as described for example in Macromolecules 1996, 29, 7661 and in WO 00/61544. This method is based on the reaction of nitroxides with halogen or pseudo-halogen containing organic compounds in the presence of suitable metals or metal salts and optionally a complexing ligand.

So far, the concept of ATRA has only been applied to the preparation of monomeric alkoxyamines. Polymeric alkoxyamines prepared by ATRA polymerization have so far not been mentioned in the prior art.

One aspect of the invention is a process for the preparation of a polymeric alkoxyamine comprising the following steps a) reacting a mono nitroxide of formula (A) X-Ln-NO. (A); or b) reacting a bis nitroxide of formula (B) .ON-Ln-NO. (B) with a bis-functional compound of formula (C) X-Lh-X (C); or c) reacting a polynitroxide of formula (D) Ln-[NO.]$_n$ (D) with a poly-functional compound of formula (E) Lh-[X]$_n$ (E);

in the presence of a transition metal or transition metal salt in its lower oxidation state and optionally a ligand, capable of complexing the transition metal or transition metal salt;

wherein

X is halogen or —SCN;

Ln is a n valent spacer group connecting the nitroxide group with the group X or with the other nitroxide groups;

Lh is a n valent spacer group connecting the groups X n is a number from 3 to 6.

The spacer group L and the nitroxide radical may for example be of structure (F)

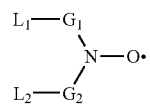

(F) wherein $G_1$ and $G_2$ independently represent a tertiary carbon atom to which unsubstituted $C_1$-$C_{18}$alkyl or phenyl; or $C_1$-$C_{18}$alkyl or phenyl substituted with CN, OH, COC$_1$-$C_{18}$alkyl, CO-phenyl, COOC$_1$-$C_{18}$alkyl, OC$_1$-$C_{18}$alkyl, NO$_2$, NHC$_1$-$C_{18}$alkyl or N(C$_1$-C$_{18}$)$_2$alkyl are bonded; or one of $G_1$ and $G_2$ is a secondary carbon atom to which a group —P(O)(OR$_{22}$)$_2$ is bonded and the other is as defined above; or $G_1$ and $G_2$ together with the nitrogen atom to which they are bonded form a 5 to 8 membered heterocyclic ring or a polycyclic or spirocyclic 5 to 20 membered heterocyclic ring system, which is substituted with 4 $C_1$-$C_4$alkyl groups or 2 $C_5$-$C_{12}$ spirocycloalkyl groups in ortho position to the nitrogen atom and which may be further substituted with one or more $C_1$-$C_{18}$alkyl, $C_1$-$C_{18}$alkoxy or =O groups; and which may be interrupted by a further oxygen or nitrogen atom;

$L_1$ and $L_2$ are linking groups which are for example R$_{101}$—Y or R$_{102}$—C(O)—Y— where Y is attached to G$_1$ and/or G$_2$; $C_1$-$C_{25}$alkylene, $C_2$-$C_{25}$alkylene interrupted by —O—, —S—, —SO—, —SO$_2$—,

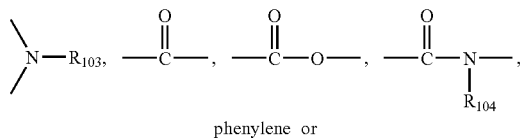

phenylene or $C_5$-$C_8$cycloalkylene; Y is O, or NR$_{109}$ wherein R$_{101}$ is $C_1$-$C_{18}$alkylene, R$_{102}$ is a direct bond or $C_1$-$C_{18}$alkylene, R$_{103}$ and R$_{104}$ are independently hydrogen or $C_1$-$C_{18}$alkyl and R$_{109}$ is hydrogen, $C_1$-$C_{18}$alkyl, $C_3$-$C_{18}$alkenyl, $C_3$-$C_{18}$alkinyl, phenyl, $C_7$-$C_9$phenylalkyl, which all may be unsubstituted or substituted by one or more hydroxy, halogen or $C_1$-$C_4$alkoxy groups.

Alkyl having up to 18 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl.

$C_3$-$C_{18}$alkyl interrupted by oxygen, sulfur or by

is, for example, CH$_3$—O—CH$_2$CH$_2$—, CH$_3$—S—CH$_2$CH$_2$—, CH$_3$—N(CH$_3$)—CH$_2$CH$_2$—, CH$_3$—O—CH$_2$CH$_2$—O—CH$_2$CH$_2$—, CH$_3$—(O—CH$_2$CH$_2$—)$_2$O—CH$_2$CH$_2$—, CH$_3$—(O—CH$_2$CH$_2$—)$_3$O—CH$_2$CH$_2$— or CH$_3$—(O—CH$_2$CH$_2$—)$_4$O—CH$_2$CH$_2$—.

C$_7$-C$_9$phenylalkyl is, for example, benzyl, α-methylbenzyl, α,α-dimethylbenzyl or 2-phenylethyl. Preference is given to benzyl and α,α-dimethylbenzyl.

C$_1$-C$_{25}$alkylene is a branched or unbranched radical, for example methylene, ethylene, propylene, trimethylene, tetramethylene, pentamethylene, hexamethylene, heptamethylene, octamethylene, decamethylene, dodecamethylene or octadecamethylene.

C$_2$-C$_{25}$alkylene interrupted by —O—, —S—, —SO—, —SO$_2$—,

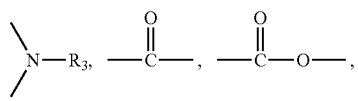

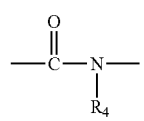

, phenylene or C$_5$-C$_8$cycloalkylene is, for example, —CH$_2$—O—CH$_2$—, —CH$_2$—S—CH$_2$—, —CH$_2$—N(CH$_3$)—CH$_2$—, —CH$_2$—O—CH$_2$CH$_2$—, —CH$_2$CH$_2$—O—CH$_2$CH$_2$—, —CH$_2$CH$_2$—O—CH$_2$CH$_2$—O—CH$_2$CH$_2$—, —CH$_2$CH$_2$—(O—CH$_2$CH$_2$—)$_2$O—CH$_2$CH$_2$—, —CH$_2$CH$_2$—(O—CH$_2$CH$_2$—)$_3$O—CH$_2$CH$_2$—, —CH$_2$CH$_2$—(O—CH$_2$CH$_2$—)$_4$O—CH$_2$CH$_2$—

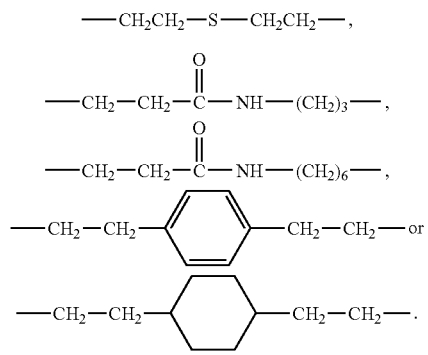

Alkenyl having 2 to 24 carbon atoms is a branched or unbranched radical such as, for example, vinyl, propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl or n-4-octadecenyl. Preference is given to alkenyl having 3 to 18, especially 3 to 12, for example 3 to 6, especially 3 to 4 carbon atoms.

Alkinyl having from 3 to 18 carbon atoms is a branched or unbranched radical, for example propinyl, 2-butinyl, 3-butinyl, isobutinyl, n-2,4-pentadiinyl, 3-methyl-2-butinyl, n-2-octinyl, n-2-dodecinyl, isododecinyl.

Halogen is, for example, chlorine, bromine or iodine. Preference is given to chlorine and bromine.

Alkoxy having up to 25 carbon atoms is a branched or unbranched radical, for example methoxy, ethoxy, propoxy, isopropoxy, n-butoxy, isobutoxy, pentyloxy, isopentyloxy, hexyloxy, heptyloxy, octyloxy, decyloxy, tetradecyloxy, hexadecyloxy or octadecyloxy. Preference is given to alkoxy having from 1 to 12, especially from 1 to 8, e.g. from 1 to 6, carbon atoms.

Alkanoyloxy having up to 25 carbon atoms is a branched or unbranched radical, for example acetoxy, propionyloxy, butanoyloxy, pentanoyloxy, hexanoyloxy, heptanoyloxy, octanoyloxy, nonanoyloxy, decanoyloxy, undecanoyloxy, dodecanoyloxy, tridecanoyloxy, tetradecanoyloxy, pentadecanoyloxy, hexadecanoyloxy, heptadecanoyloxy, octadecanoyloxy, icosanoyloxy or docosanoyloxy. Preference is given to alkanoyloxy having from 2 to 18, especially from 2 to 12, e.g. from 2 to 6, carbon atoms.

Hydroxyl-substituted C$_2$-C$_{18}$alkyl is a branched or unbranched radical which contains preferably 1 to 3, in particular 1 or 2, hydroxyl groups, such as, for example, hydroxyethyl, 3-hydroxypropyl, 2-hydroxypropyl, 4-hydroxybutyl, 3-hydroxybutyl, 2-hydroxybutyl, 5-hydroxypentyl, 4-hydroxypentyl, 3-hydroxypentyl, 2-hydroxypentyl, 6-hydroxyhexyl, 5-hydroxyhexyl, 4-hydroxyhexyl, 3-hydroxyhexyl, 2-hydroxyhexyl, 7-hydroxyheptyl, 6-hydroxyheptyl, 5-hydroxyheptyl, 4-hydroxyheptyl, 3-hydroxyheptyl, 2-hydroxyheptyl, 8-hydroxyoctyl, 7-hydroxyoctyl, 6-hydroxyoctyl, 5-hydroxyoctyl, 4-hydroxyoctyl, 3-hydroxyoctyl, 2-hydroxyoctyl, 9-hydroxynonyl, 10-hydroxydecyl, 11-hydroxyundecyl, 12-hydroxydodecyl, 13-hydroxytridecyl, 14-hydroxytetradecyl, 15-hydroxypentadecyl, 16-hydroxyhexadecyl, 17-hydroxyheptadecyl, 18-hydroxyoctadecyl.

C$_5$-C$_{12}$cycloalkyl is for example cyclopentyl, cyclohexyl, cycloheptyl, methylcyclopentyl or cyclooctyl.

Aryl is phenyl or naphthyl, preferably phenyl.

The above nitroxides can be prepared in analogy to known methods.

The preparation of open chain alkoxyamines is for example described in WO 99/03894 or in WO 00/07981. Alkoxyamines based on tetraalkyl piperidine are for example described in GB 2 335 1290 or in GB 2 361 235. Further heterocyclic alkoxyamines are described in GB 2 342 649.

For example the ligand is of formula III

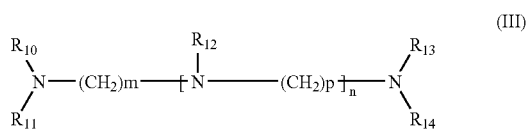

whererin R$_{10}$, R$_{11}$, R$_{13}$ and R$_{14}$ are independently H, C$_1$-C$_{12}$alkyl, C$_5$-C$_{12}$cycloalkyl or aryl;

R$_{12}$ is H, C$_1$-C$_{12}$alkyl, C$_5$-C$_{12}$cycloalkyl or aryl or a group —(CH$_2$)q-NR$_{10}$R$_{11}$;

m,p and q are numbers from 1 to 4;

n is a number from 0 to 4; or the ligand is a bicyclic or polycyclic heteroaliphatic ring.

Suitable individual ligands are for example tris[2-(dimethylamino)ethyl]amine, N,N,N',N',N''-pentamethyldiethylenetriamine, N,N,N',N'-tetramethylethylenediamine, 1,1,4,7,10,10-hexamethyltriethylenetetramine, 1,4,7-trimethyl-1,4,7-triazacyclononane, 1,5,9-trimethyl-1,5,9- triazacyclododecane, 1,4,8,11-tetramethyl-1,4,8,11-tetraazacyclotetradecane, 2,2'-bipyridyl, 2,2'-bi(4-t-butyl)pyridyl or 2,2',2"-terpyridyl.

The transition metal must have the possibility to exist in at least two oxidation stages.

A typical process is, wherein the molar ratio between the transition metal or transition metal salt in its lower oxidation state and the halogen or —SCN containing compound is from 1:1 to 1:3.

The transition metal is preferably selected from the group consisting of Cu, Fe, Mn, Mo, Cr, Ni and Ru and the transition metal salt in its lower oxidation state is a halogenide, sulfate, nitrate, carboxylate or trifluormethane sulfonate of these metals.

It is also possible to use a mixture of transition metals or transition metal salts or a mixture of metals and salts.

The molar ratio between the ligand and the transition metal or transition metal salt in its lower oxidation state is from 0.5:1 to 1:5 in particular from 1:1 to 1:3.

The process is typically carried out at a temperature from −20° C. to 100° C., preferably from 0° C. to 40° C.

A preferred embodiment of the invention is a process wherein a) the mono nitroxide of formula (A) is of formula (Ia), (Ib) or Ic)

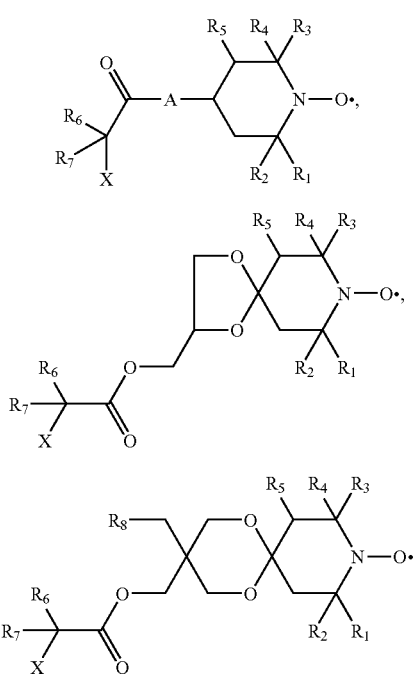

b) the dinitroxide of formula (B) is of formula (IIa), (IIb), (IIc) or (IId)

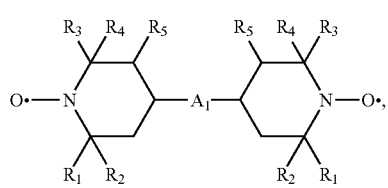

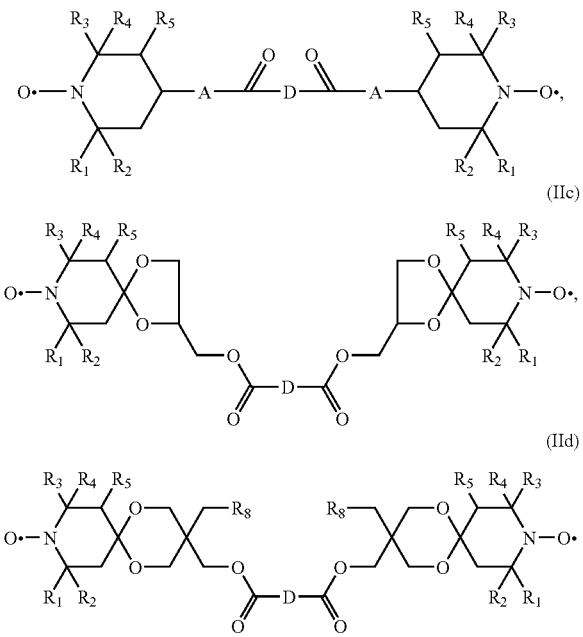

the compound of formula (C) is of formula (III)

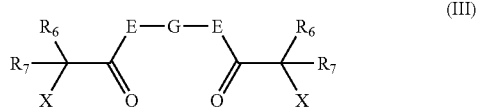

c) the polynitroxide of formula D is of formula (IVa), (IVb) or (IV)c)

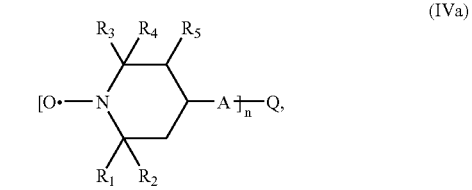

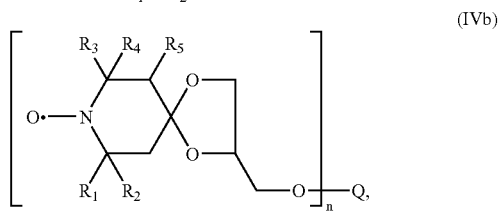

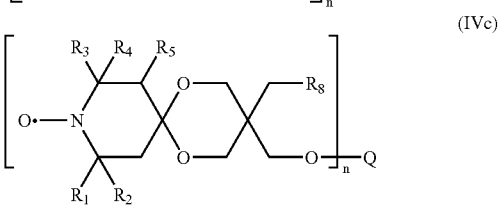

the compound of formula (E) is of formula (V)

$$\left[ \begin{array}{c} R_6 \\ R_7 \end{array} \right. \overset{O}{\underset{X}{\|}} \left. \right]_n P \quad (V)$$

wherein in the formulas $R_1$, $R_2$, $R_3$ and $R_4$ are methyl or ethyl; or $R_1$ and $R_2$ and/or $R_3$ and $R_4$ together with the carbon atom to which they are bonded form a $C_5$-$C_8$cycloalkyl ring:

$R_5$ is H or methyl;

$R_6$ and $R_7$ are H, $C_1$-$C_8$-alkyl or aryl;

$R_8$ is H or methyl;

X is halogen or —SCN;

A is O or $NR_9$ wherein $R_9$ is H or $C_1$-$C_{18}$alkyl, $C_5$-$C_{12}$cycloalkyl or aryl;

$A_1$ is a group —$NR_9$—$(CH_2)_a$—$NR_9$— wherein a is a number from 2 to 12 or a group

[triazine structure with A, A, A substituents and $R_9$]

D is a direct bond or $C_1$-$C_{12}$alkylene, $C_5$-$C_{12}$cycloalkylene or arylene, wherein the alkylene and cycloalkylene may be interrupted by one or more O, S or N atoms;

E is a direct bond, O or $NR_9$;

G is $C_1$-$C_{12}$alkylene, $C_5$-$C_{12}$cycloalkylene or arylene wherein the alkylene and cycloalkylene may be interrupted by one or more O, S or N atoms;

n is 3 or 4;

Q is the acyl residue of a trivalent or tetravalent carboxylic acid;

P is the residue of a trivalent or tetravalent alcohol.

Examples for the substituents have already been given.

Examples for trivalent or tetravalent acyl residues are derived from the corresponding carboxylic acids, such as citric acid, trimellitic acid, trimesinic acid, pyromelitic acid or butane tetracarboxylic acid.

Examples for trivalent or tetravalent alcohols are glycerine, tris(hydroxymethyl)-propane, pentaerythritol, erythritol or tris(hydroxymethyl)-aminomethane.

Preferred is a process wherein the compound is of formula (Ia), (Ib) or (Ic).

Particularly preferred is a process wherein the compound is of formula (Ia), (Ib) or (Ic);

$R_1$, $R_2$, $R_3$ and $R_4$ are methyl;

$R_5$ is H;

$R_6$ and $R_7$ are independently H or methyl;

$R_8$ is H or methyl;

X is Cl or Br;

A is O or $NR_9$ and $R_9$ is H or $C_1$-$C_{18}$alkyl.

Most preferably the compound is of formula (Ia).

It is for example also possible to carry out the process with more than one nitroxide and/or halogen compound.

This results in a random copolymer. It is also possible to polymerize different nitroxides and/or halogen compounds in a sequential manner, which will result in block copolymers. By changing the ratio between the nitroxide and halogen functionalities to another value than 1:1, it is possible to adjust the degree of polymerization and hence the molecular weight of the polymer. This can be achieved for example by addition of a nitroxide, which does not bear an active halogen atom.

The polymers obtained are telechelic polymers having in principle attached to one end the halogen or pseudo halogen moiety and to the other end the nitroxyl moiety. Both ends may further be used in polymer analogous reactions. For example the halogen or pseudo halogen group can be removed by an elimination reaction leaving a double bond at the polymer. The nitroxyl group may be reduced to the amine or hydroxylamine and further reacted for example in an acylation reaction.

The process may be carried out in bulk, in case where liquid components are used as starting materials or in a suitable organic solvent.

Suitable solvents are toluene, cyclohexane, petrolether, ester, such as ethylacetate, amides, such as dimethylformamide or dimethylacetamide, ketones, such as acetone, methyl-ethyl ketone, ether, such as tetrahydrofurane or methyl-t-butylether, alcohols, such as methanol, ethanol, isopropanol or butanol.

A further aspect of the invention is a polymer obtainable by a process as described above.

Preferred is a polymer with a repetitive structural element of formula (I'a), (I'b), (I'c)

[Structure (I'a) showing polymer with $R_6$, $R_7$, A, $R_5$, $R_4$, $R_3$, $R_2$, $R_1$ and N—O group, subscript m]

[Structure (I'b) showing polymer with $R_6$, $R_7$, $R_5$, $R_4$, $R_3$, $R_2$, $R_1$ and N—O group, subscript m]

[Structure (I'c) showing polymer with $R_8$, $R_6$, $R_7$, $R_5$, $R_4$, $R_3$, $R_2$, $R_1$ and N—O group, subscript m]

(II'a), (II'b), (II'c) or (II'd)

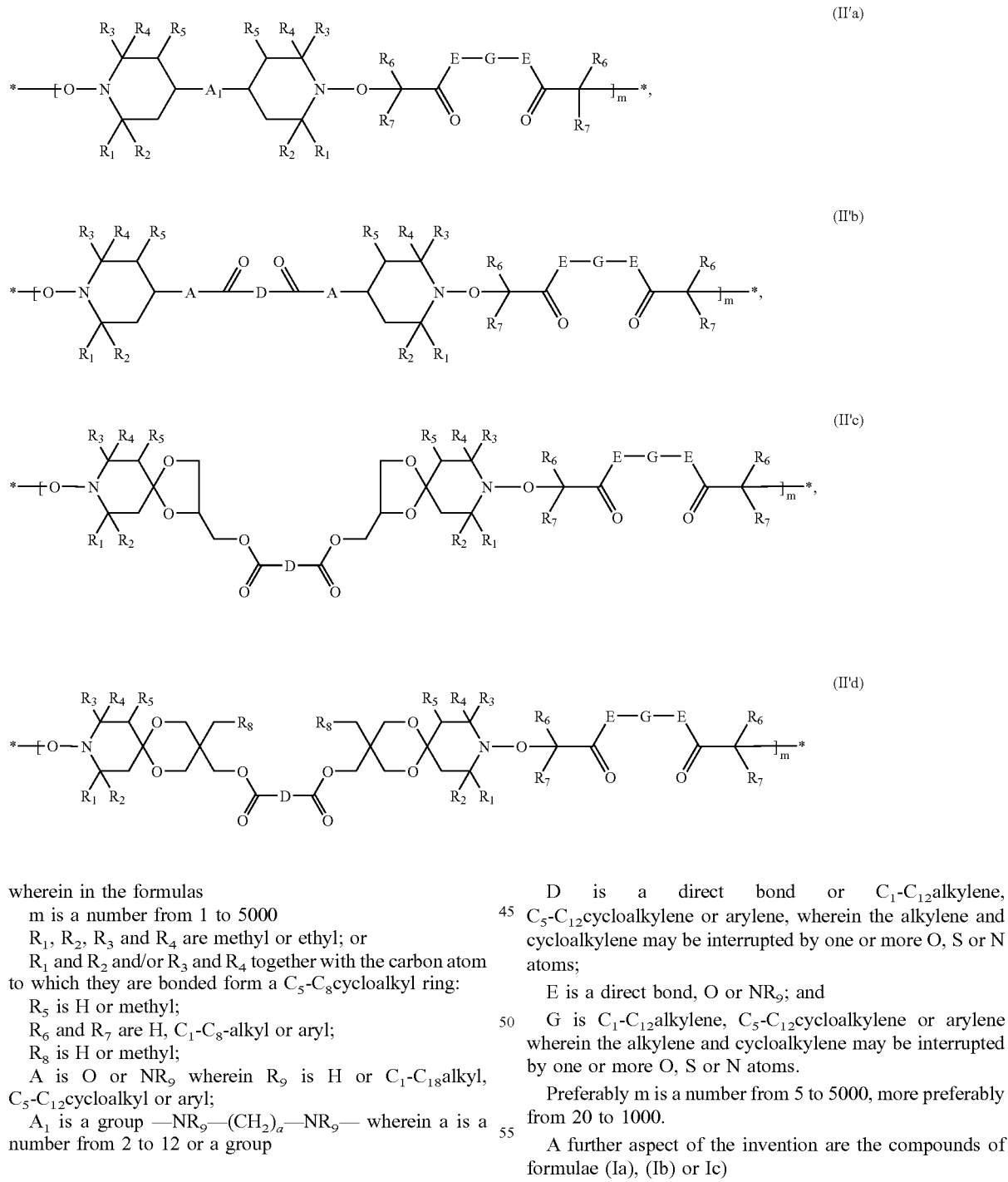

wherein in the formulas m is a number from 1 to 5000

$R_1$, $R_2$, $R_3$ and $R_4$ are methyl or ethyl; or $R_1$ and $R_2$ and/or $R_3$ and $R_4$ together with the carbon atom to which they are bonded form a $C_5$-$C_8$cycloalkyl ring:

$R_5$ is H or methyl;

$R_6$ and $R_7$ are H, $C_1$-$C_8$-alkyl or aryl;

$R_8$ is H or methyl;

A is O or $NR_9$ wherein $R_9$ is H or $C_1$-$C_{18}$alkyl, $C_5$-$C_{12}$cycloalkyl or aryl;

$A_1$ is a group —$NR_9$—$(CH_2)_a$—$NR_9$— wherein a is a number from 2 to 12 or a group

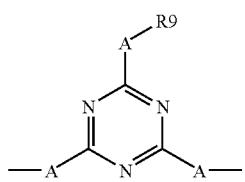

and

D is a direct bond or $C_1$-$C_{12}$alkylene, $C_5$-$C_{12}$cycloalkylene or arylene, wherein the alkylene and cycloalkylene may be interrupted by one or more O, S or N atoms;

E is a direct bond, O or $NR_9$; and

G is $C_1$-$C_{12}$alkylene, $C_5$-$C_{12}$cycloalkylene or arylene wherein the alkylene and cycloalkylene may be interrupted by one or more O, S or N atoms.

Preferably m is a number from 5 to 5000, more preferably from 20 to 1000.

A further aspect of the invention are the compounds of formulae (Ia), (Ib) or Ic)

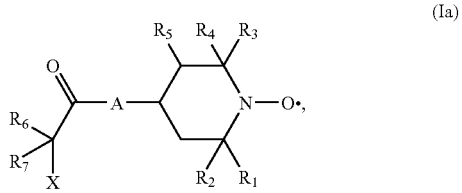

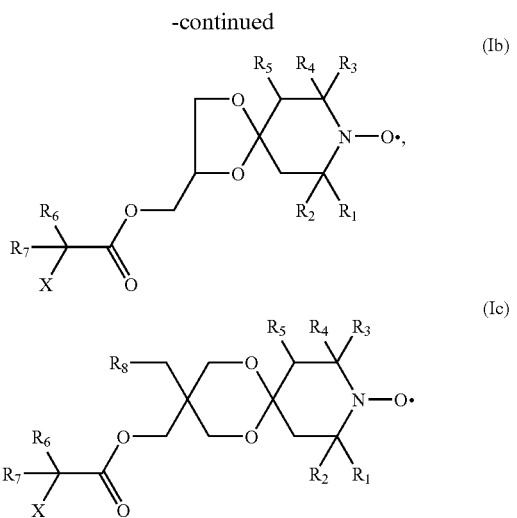

wherein in the formulas $R_1$, $R_2$, $R_3$ and $R_4$ are methyl or ethyl; or $R_1$ and $R_2$ and/or $R_3$ and $R_4$ together with the carbon atom to which they are bonded form a $C_5$-$C_8$cycloalkyl ring:

$R_5$ is H or methyl;

$R_6$ and $R_7$ are H, $C_1$-$C_8$-alkyl or aryl;

$R_8$ is H or methyl;

X is halogen or —SCN; and

A is O or $NR_9$ wherein $R_9$ is H or $C_1$-$C_{18}$alkyl, $C_5$-$C_{12}$cycloalkyl or aryl.

Examples for the individual substituents and their preferences have already been given above, they apply also for the monomers and polymers.

The above compounds can be prepared according to known methods, which are illustrated in the examples. Nitroxyls based on tetraalkyl piperidine are for example described in GB 2 335 1290, in GB 2 361 235 or WO 02/48205. Further heterocyclic nitroxyls are described in GB 2 342 649.

Yet another aspect of the invention is a stabilized composition, which comprises (a) an organic material subject to degradation by heat, light or oxygen, and (b) a compound obtained by a process as described above.

Preferably the organic material of component (a) is a natural or synthetic polymer.

Examples for natural and synthetic polymers are given below.

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LL-DPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

In a specific embodiment of the invention the composition additionally contains at least one coadditive stabilizer selected from the group consisting of the phenolic antioxidants, metal stearates, metal oxides, organophosphorus compounds, furanone antioxidants, hydroxylamines, UV absorbers, hindered amines stabilizer different from that obtained according to the process outlined above.

Examples for such costabilizers and further additives are mentioned below.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example $\alpha$-tocopherol, $\beta$-tocopherol, $\gamma$-tocopherol, $\delta$-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-($\alpha$-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-($\alpha$-methylbenzyl)-4-nonylphenol], 2,2'-methylenebis[6-($\alpha,\alpha$-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of $\beta$-(3,5-di-tert-butyl-4-hydroxyphenyl)propionic acid with mono- or polyhydric alcohols, e.g. with methanol, ethanol, n-octanol, i-octanol, octadecanol, 1,6- hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tertbutyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris (2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino) ethane, the condensate of 2-chloro-4,6-di-(4-n-butylamino-1,2,2,6,6-pentamethylpiperidyl)-1,3,5-triazine and 1,2-bis (3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinImide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5] decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis (benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis (2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl)

ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos®168, Ciba-Geigy), tris(nonylphenyl) phosphite,

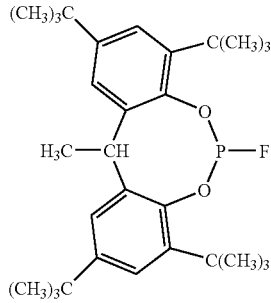
(A)

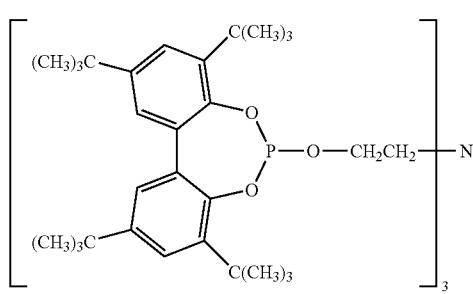
(B)

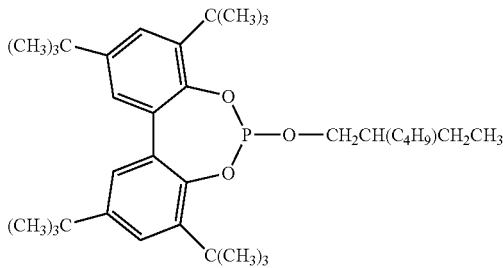
(C)

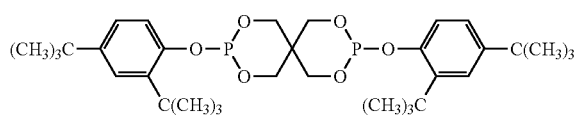
(D)

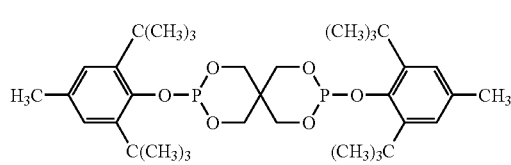
(E)

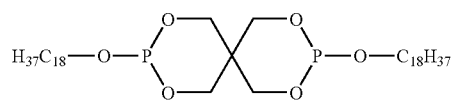
(F)

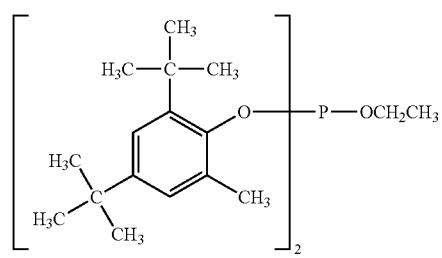
(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

The polymeric alkoxyamines of the invention and optionally further additives may be incorporated into the polymer to be stabilized by conventional techniques.

The additives of the invention and optional further components may be added to the polymer material individually or mixed with one another. If desired, the individual components can be mixed with one another before incorporation into the polymer for example by dry blending, compaction or in the melt.

The incorporation of the additives of the invention and optional further components into the polymer is carried out by known methods such as dry blending in the form of a powder, or wet mixing in the form of solutions, dispersions or suspensions for example in an inert solvent, water or oil. The additives of the invention and optional further additives may be incorporated, for example, before or after molding or also by applying the dissolved or dispersed additve or additive mixture to the polymer material, with or without subsequent evaporation of the solvent or the suspension/dispersion agent. They may be added directly into the processing apparatus (e.g. extruders, internal mixers, etc), e.g. as a dry mixture or powder or as solution or dispersion or suspension or melt.

The incorporation can be carried out in any heatable container equipped with a stirrer, e.g. in a closed apparatus such as a kneader, mixer or stirred vessel. The incorporation is preferably carried out in an extruder or in a kneader. It is immaterial whether processing takes place in an inert atmosphere or in the presence of oxygen.

The addition of the additive or additive blend to the polymer can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing.

Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffextrusion*, Vol. 1 Grundlagen, Editors F. Hensen, W. Knappe, H. Potente, 1989, pp. 3-7, ISBN: 3-446-14339-4 (Vol. 2 Extrusionsanlagen 1986, ISBN 3-446-14329-7).

For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The incorporation of the additives can also be carried out at a level lower than maximum throughput by varying the parameters mentioned or employing weighing machines delivering dosage amounts.

If a plurality of components are added, these can be premixed or added individually.

The additives of the invention and optional further additives can also be sprayed onto the polymer material. They are able to dilute other additives (for example the conventional additives indicated above) or their melts so that they can be sprayed also together with these additives onto the material. Addition by spraying during the deactivation of the polymerization catalysts is particularly advantageous; in this case, the steam evolved may be used for deactivation of the catalyst. In the case of spherically polymerized polyolefins it may, for example, be advantageous to apply the additives of the invention, optionally together with other additives, by spraying.

The additives of the invention and optional further additives can also be added to the polymer in the form of a masterbatch ("concentrate") which contains the components in a concentration of, for example, about 1% to about 40% and preferably 2% to about 20% by weight incorporated in a polymer. The polymer must not be necessarily of identical structure than the polymer where the additives are added finally. In such operations, the polymer can be used in the form of powder, granules, solutions, suspensions or in the form of latices.

Incorporation can take place prior to or during the shaping operation, or by applying the dissolved or dispersed compound to the polymer, with or without subsequent evaporation of the solvent. In the case of elastomers, these can also be stabilized as latices. A further possibility for incorporating the additives of the invention into polymers is to add them before, during or directly after the polymerization of the corresponding monomers or prior to crosslinking. In this context the additive of the invention can be added as it is or else in encapsulated form (for example in waxes, oils or polymers).

The materials containing the additives of the invention described herein can be used for the production of moldings, rotomolded articles, injection molded articles, blow molded articles, films, tapes, mono-filaments, fibers, nonwovens, profiles, adhesives or putties, surface coatings and the like.

Yet further aspects of the invention are the uses of a polymer obtainable by a process as described above as stabilizer for natural or synthetic polymers, as a flame retardant additive in natural or synthetic polymers and as polymerization initiator/regulator in controlled radical polymerization reactions.

The following examples illustrate the invention

EXAMPLE 1

ATRA Polycondensation of 2-bromo-2-methyl-propionic acid 2,2,6,6-tetramethyl-piperidine-4-yl ester-N-oxyl a) Preparation of 2-bromo-2-methyl-propionic acid 2,2,6,6-tetramethyl-piperidine-4-yl ester-N-oxyl To a solution of 17.2 g (0.1 mol) 4-hydroxy-2,2,6,6-tetramethylpiperidine-1-N-oxyl (4-hydroxy TEMPO) in 150 ml toluene 17.85 ml (0.128 mol) triethylamine are added. 29.4 g (0.128 mol) of 2-bromo-isobutyric acid bromide are added dropwise at a temperature between 30-35° C. The mixture is stirred for 24 hours at room temperature. 200 ml water are added and the organic phase is separated. The organic phase is washed twice with 50 ml water each, dried over MgSO$_4$ and the solvent is evaporated. After recrystallization from methanol 20.65 g (64%) of the title compound are obtained as red crystals with a melting point of 77-79° C.

$C_{13}H_{23}BrNO_3$ calculated: C, 48.61%; H, 7.22%; N, 4.36%. found: C, 48.63%; H, 7.11%; N, 4.33%.

b) ATRA Polycondensation

To a solution of 6.22 g (0.02 mol) 2-bromo-2-methyl-propionic acid 2,2,6,6-tetramethyl-piperidine-4-yl ester-N-oxyl in 25 ml dimethylformamide (DMFA) 3.96 g (0.04 mol) CuCl are added. To the stirred suspension 8.4 ml (0.04 mol) pentamethyl-diethylene-triamine are continuously added under Argon atmosphere during 252 minutes at 20-25° C. with the aid of a dosing pump. The mixture is further stirred for 17 hours at room temperature. Thereafter 300 ml water and 700 ml dichlormethane are added. The organic phase is separated, shaked out with 75 ml water and 10 ml HCl (32%), washed three times with 100 ml water each, once with 100 ml 1M-NaHCO$_3$, dried over MgSO$_4$ and the solvent evaporated. 4.65 g of an amorphous slightly yellow polymer are obtained having the idealized structure:

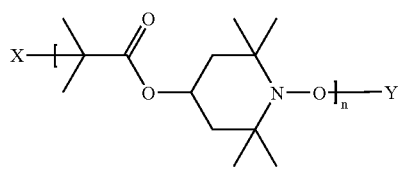

Mn=1399, Mw=2175.

X is predominantly Br; Y is predominantly

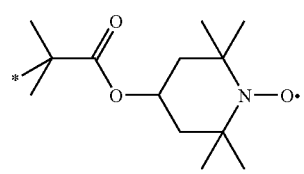

* denotes the bond. There may, however, to a minor degree also other end groups occur which result, for example, from reduction of the nitroxide function or hydrogen halide elimination.

EXAMPLE 2

ATRA polycondensation of chloro-phenyl-acetic acid 2,2,6,6-tetramethyl-piperidine-4-yl ester-N-oxyl a) Preparation of chloro-phenyl-acetic acid 2,2,6,6-tetramethyl-piperidine-4-yl ester-N-oxyl To a suspension of 7.9 g (0.05 mol) 4-hydroxy-2,2,6,6-tetramethylpiperidine in 40 ml toluene 7.3 ml (0.0515 mol) triethylamine are added and subsequently 10.7 g (0.0515 mol) α-chloro-phenylacetic acid are dropwise added at a temperature of 10° C. The mixture is stirred for 3 hours at room temperature, then 200 ml water are added and the organic phase is separated. The organic phase is washed twice with 50 ml water each, dried over MgSO$_4$ and the solvent evaporated. The residue is dissolved in 20 ml toluene, 8 ml water are added and to the stirred emulsion 5.2 g (0.08 mol) peracetic acid (40% in acetic acid) are drop wise added at 20-30° C. The pH of the mixture is kept constant between 6-6.2 during the addition of the peracetic acid by simultaneous addition of a 40% NaOH solution in water. After 1 hour stirring, the organic phase is separated, washed twice with 50 ml 1M-NaHCO$_3$ each, 50 ml water, dried over MgSO$_4$ and the solvent is evaporated. The residue is purified by chromatography on silica gel with hexane-ethylacetate (6:1) as eluent. 10.35 g (63.7%) of the title compound are obtained as red oil.

$C_{17}H_{23}ClNO_3$ calculated: C, 62.86%; H, 7.14%; N, 4.31%; Cl, 10.91. found: C, 62.97%; H, 7.17%; N, 4.19%; Cl, 10.9%.

b) ATRA Polykondensation 6.497 g (0.02 mol) chloro-phenyl-acetic acid 2,2,6,6-tetramethyl-piperidine-4-yl ester-N-oxyl, 3.96 g (0.04 mol) CuCl and 8.4 ml (0.04 mol) pentamethyl-diethylene-triamine in 25 ml dimethylformamide (DMFA) are polymerized according to example 1. 5.64 g of a yellowish glassy polymer are obtained having an idealized structure of:

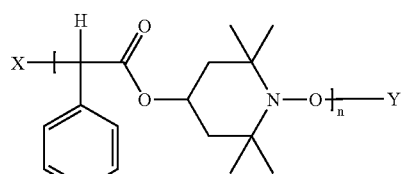

Mn=1621, Mw=7163.

X is predominantly Cl; Y is predominantly

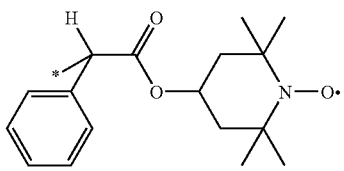

* denotes the bond. There may, however, to a minor degree also other end groups occur, which result, for example, from reduction of the nitroxide function or hydrogen halide elimination.

EXAMPLE 3

ATRA polycondensation of decanedioic acid bis-(2,2,6,6-tetramethyl-piperidine-N-oxyl-4-yl) ester with 2-bromo-propionic acid 2-(2-bromo-propionyloxy)-ethyl ester a) Preparation of 2-bromo-propionic acid 2-(2-bromo-propionyloxy)-ethyl ester To 500 ml toluene, 31 g (0.5 mol) ethylenglykol, 87 g (1.125 mol) pyridin and a solution of 227.2 g (1.052 mol) 2-brompropionic acid-bromide in 100 ml toluene is slowly drop wise added at 8-10° C. The suspension is stirred for an hour at room temperature, the precipitate is filtered off and washed with 200 ml toluene. The filtrate is washed with 100 ml 1M-NaHCO$_3$ and twice with 100 ml water each, dried over Na$_2$SO$_4$ and the solvent evaporated. 153.4 g (92.4%) of the title compound are obtained as slightly yellow oil.

$^1$H-NMR (300 MHz, CDCl$_3$): 4.49-4.37 m(3H), 1.85-1.83 d(3H).

b) ATRA Polycondensation

To a degassed solution of 5.107 g (0.01 mol) decanedioic acid bis-(2,2,6,6-tetramethyl-piperidine-N-oxyl-4-yl) ester, prepared according U.S. Pat. No. 5,574,163 and 3.422 g (0.01 mol) 2-bromo-propionic acid 2-(2-bromo-propionyloxy)-ethyl ester in 25 ml DMFA and 3.96 g (0.04 mol) CuCl are added. To the stirred suspension 8.4 ml (0.04 mol) pentamethyl-diethylen-triamine are continuously added under Argon atmosphere during 252 minutes at 20-25° C. with the aid of a dosing pump. The mixture is stirred for 14 hours at room temperature and subsequently 400 ml water and 250 ml dichlormethane are added. The organic phase is separated, washed with 4×200 ml of a 1% solution of ethylendiamine-tetraacetic acid disodium salt, dried over MgSO$_4$ and the solvent is evaporated. 5.9 g of an amorphous yellowish powder are obtained having the idealized structure:

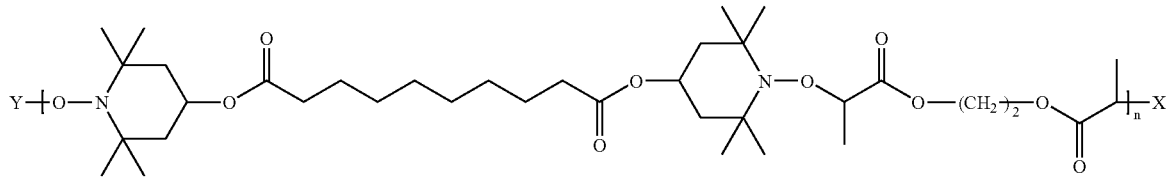

Mn=3474, Mw=27752

X is predominantly Br; Y is predominantly

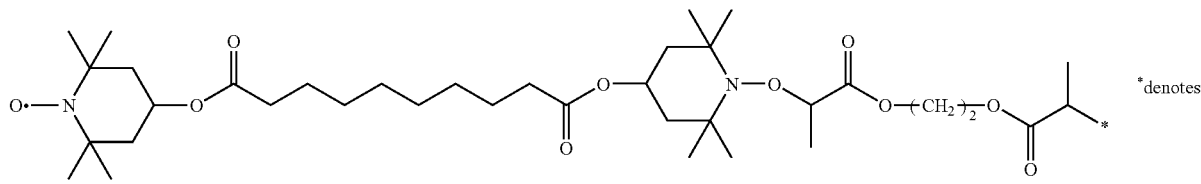

*denotes the bond. There may, however, to a minor degree also other end groups occur which result, for example, from reduction of the nitroxide function or hydrogen halide elimination.

c) ATRA Polykondensation with the Addition of 4-hydroxy-TEMPO

To a degassed solution of 4.596 g (0.009 mol) decanedioic acid bis-(2,2,6,6-tetramethyl-piperidine-N-oxyl-4-yl) ester prepared according to U.S. Pat. No. 5,574,163), 3.422 g (0.01 mol) 2-bromo-propionic acid 2-(2-bromo-propionyloxy)-ethyl ester, 0.344 g (0.002 mol) 4-hydroxy-TEMPO in 25 ml DMFA and 3.96 g (0.04 mol) CuCl are added. To the stirred suspension 8.4 ml (0.04 mol) pentamethyl-diethylentriamine are continuously added under Argon atmosphere during 252 minutes at 20-25° C. with the aid of a dosing pump. The mixture is stirred for 17 hours at room temperature and subsequently 400 ml water and 250 ml dichlormethane are added. The organic phase is separated, washed with 4×200 ml of a 1% solution of ethylendiamine-tetraacetic acid disodium salt, dried over MgSO$_4$ and the solvent evaporated. 6.71 g of an amorphous yellowish powder are obtained having the idealized structure:

are added drop wise at 5-10° C. The mixture is stirred at room temperature for 18 hours, then 200 ml water are added, the organic phase is separated washed with 100 ml 1M-NaHCO$_3$ and 100 ml water, dried over MgSO$_4$ and the solvent evaporated. 37.35 g (96%) of the title compound are obtained as a colorless oil.

$^1$H-NMR (300 MHz, CDCl$_3$): 4.41-4.34 q(1H), 4.24-4.10 m(2H), 1.84-1.81 d(3H), 1.72-1.67 m(2H), 1.48-1.38 m(2H).

b) ATRA Polycondensation

To a degassed solution of 5.107 g (0.01 mol) decanedioic acid bis-(2,2,6,6-tetramethyl-piperidine-N-oxyl-4-yl) ester prepared according to U.S. Pat. No. 5,574,163) and 3.881 g (0.01 mol) 2-bromo-propionic acid 6-(2-bromo-propionyloxy)-hexyl ester in 25 ml DMFA and 3.96 g (0.04 mol)

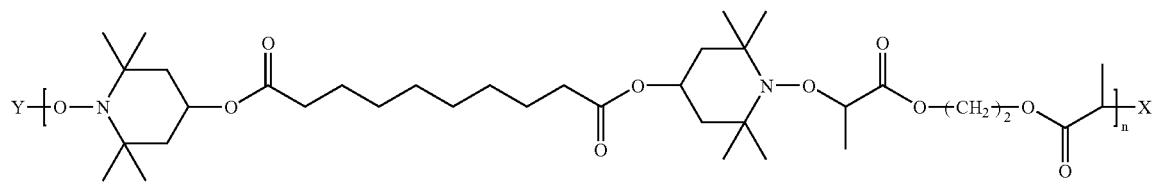

Mn=7692, Mw=13589

EXAMPLE 4

ATRA Polycondensation of decanedioic acid bis-(2,2,6,6-tetramethyl-piperidine-N-oxyl-4-yl) ester with 2-bromo-propionic acid 6-(2-bromo-propionyloxy)-hexyl ester a) Preparation of 2-bromo-propionic acid 6-(2-bromo-propionyloxy)-hexyl ester.

To a solution of 11.9 g (0.1 mol) 1,6-hexanediol in 120 ml toluene 16.6 g (0.21 mol) pyridin are added and subsequently 45.4 g (0.204 mol) 2-bromopropionic acid-bromide CuCl are added. To the stirred suspension 8.4 ml (0.04 mol) pentamethyl-diethylen-triamine are continuously added under Argon atmosphere during 252 minutes at 20-25° C. with the aid of a dosing pump. The mixture is stirred for 16 hours at room temperature and subsequently 500 ml water and 300 ml dichlormethane are added. The organic phase is separated, washed with 4×200 ml of a 1% solution of ethylendiamine-tetraacetic acid disodium salt, dried over MgSO$_4$ and the solvent evaporated. 6.17 g of an amorphous yellowish powder are obtained having the idealized structure:

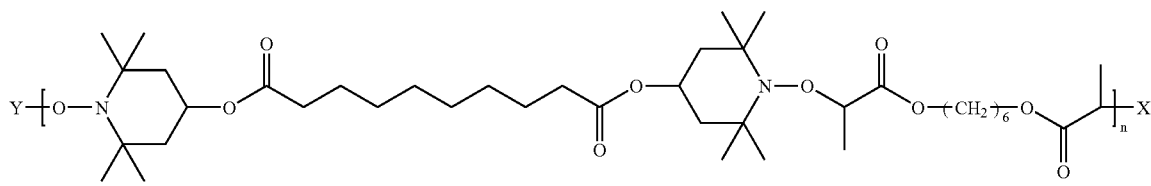

Mn=21541, Mw=43734

X is predominantly Br; Y is predominantly

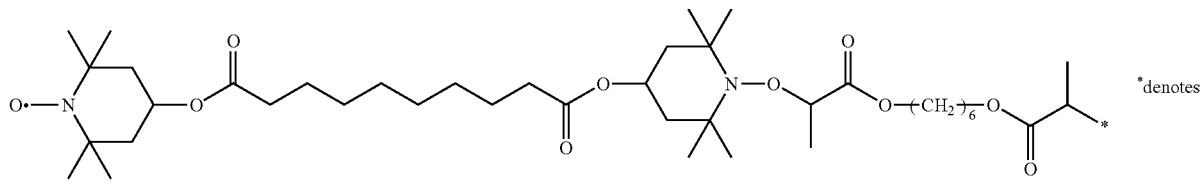

the bond. There may, however, to a minor degree also other end groups occur which result, for example, from reduction of the nitroxide function or hydrogen halide elimination.

EXAMPLE 5

ATRA Polycondensation of decanedioic acid bis-(2,2,6,6-tetramethyl-piperidine-N-oxyl-4-yl) ester with 2-bromo-propionic acid 12-(2-bromo-propionyloxy)-dodecyl ester a) Preparation of 2-bromo-propionic acid 12-(2-bromo-propionyloxy)-dodecyl ester.

From 18.2 g (0.09 mol) 1,12-dodecandiol, 15.2 ml (0.945 mol) Pyridin and 40.9 g (0.0945 mol) 2-bromo-propionic acid-bromide 40.9 g (96%) of the title compound are prepared in analogy to example 4a. A colorless oil is obtained.

$^1$H-NMR (300 MHz, CDCl$_3$): 4.40-4.33 q(1H), 4.23-4.09 m(2H), 1.84-1.81 d(3H), 1.71-1.59 m(2H), 1.40-1.28 m(8H).

b) ATRA Polycondensation

To a degassed solution of 5.107 g (0.01 mol) decanedioic acid bis-(2,2,6,6-tetramethylpiperidine-N-oxyl-4-yl) ester prepared according to U.S. Pat. No. 5,574,163 and 4.742 g (0.01 mol) 2-bromo-propionic acid 12-(2-bromo-propionyloxy)-dodecyl ester in 50 ml tetrahydrofurane (THF) 3.96 g (0.04 mol) CuCl are added. To the stirred suspension 8.4 ml (0.04 mol) pentamethyl-diethylen-triamine are continuously added under Argon atmosphere during 252 minutes at 20-25° C. with the aid of a dosing pump. The mixture is stirred for 18 hours at room temperature and filtered over a thin Cellit layer. The filtrate is evaporated and the residue is dissolved in 150 ml dichlormethane, washed with 500 ml water, 5 ml HCl (32%), 2×500 ml of a 1% solution of ethylendiamine-tetraacetic acid disodium salt and finally washed with 1×500 ml water. The solution is dried over MgSO$_4$ and the solvent evaporated. 7.29 g of amorphous yellowish polymer are obtained having the idealized structure:

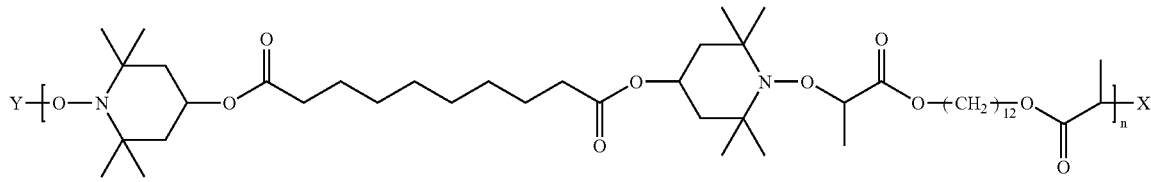

Mn=31782, Mw=69154
X is predominantly Br; Y is predominantly

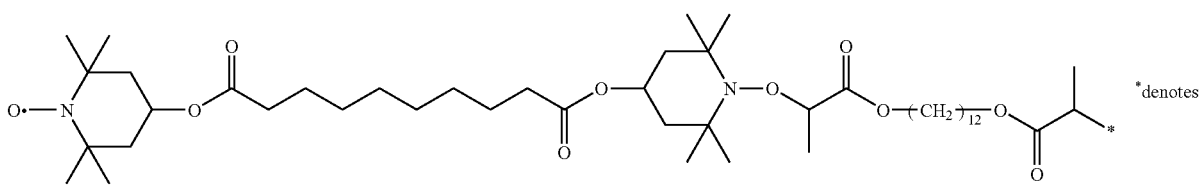

the bond. There may, however, to a minor degree also other end groups occur which result, for example, from reduction of the nitroxide function or hydrogen halide elimination.

EXAMPLE 6

ATRA Copolycondensation of decanedioic-acid bis-(2,2,6,6-tetramethyl-piperidine-N-oxyl-4-yl) ester with 2-bromo-propionic acid 12-(2-bromo-propionyloxy)-dodecyl ester and with 2-bromo-2-methyl-propionic acid 2,2,6,6-tetramethyl-piperidin-4-yl ester-N-oxyl To a degassed solution of 2.553 g (0.005 mol) decanedioic acid bis-(2,2,6,6-tetramethyl-piperidine-N-oxyl-4-yl) ester prepared according to U.S. Pat. No. 5,574,163, 2.371 g (0.005 mol) 2-bromo-propionic acid 12-(2-bromo-propionyloxy)-dodecyl ester and 1.606 g (0.005 mol) 2-bromo-2-methyl-propionic acid 2,2,6,6-tetramethyl-piperidin-4-yl ester-N-oxyl in 50 ml THF 3.96 g (0.04 mol) CuCl are added. To the stirred suspension 8.4 ml (0.04 mol) pentamethyl-diethylen-triamine are continuously added under Argon atmosphere during 252 minutes at 20-25° C. with the aid of a dosing pump. The mixture is stirred for 20 hours at room temperature and filtered over a thin Cellit layer. The filtrate Is evaporated and the residue is dissolved in 300 ml dichlormethane, washed twice with 500 ml water each, 2×200 ml of a 1% Lösung of ethylendiamine-tetraacetic acid disodium salt, dried over MgSO$_4$ and the solvent evaporated. 7.4 g of an amorphous yellowish polymer are obtained having the idealized structure:

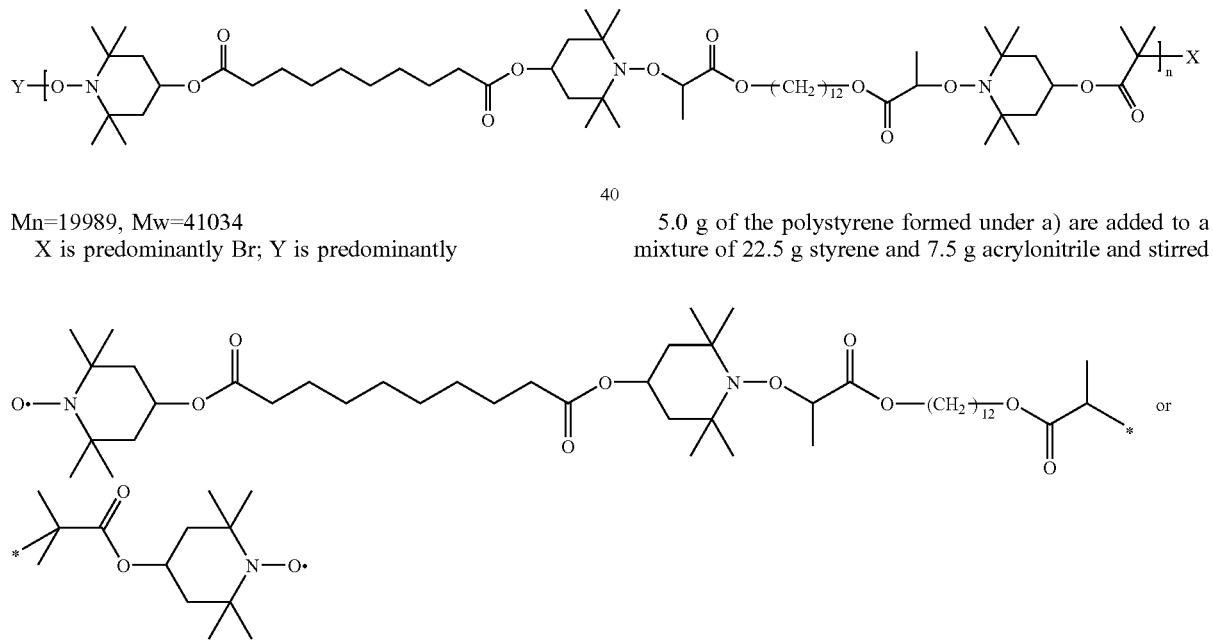

Mn=19989, Mw=41034
X is predominantly Br; Y is predominantly

* denotes the bond. There may, however, to a minor degree also other end groups occur which result, for example, from reduction of the nitroxide function or hydrogen halide elimination.

EXAMPLE 7

Use as Polymerization Regulators/Initiators
a) 1.34 g of the compound of example 2 (structure given below) are added to 45.45 g styrene and stirred under Argon at 130° C. for 6 hours. The residual monomer is removed by drying under vacuum at 70° C. 48.1% polymer are yielded, with $M_n$=35900 and $M_w$=59200 as measured by GPC analysis using polystyrene as internal standard.

b) The same procedure as described under a) is carried out using 0.134 g of the compound of example 2. 59.5% polymer are yielded with $M_n$=117000 and $M_w$=190200.

c) b) The same procedure as described under a) is carried out using 0.0134 g of the compound of example 2. 93.2% polymer are yielded with $M_n$=151400 and $M_w$=270100.

Polymeric Alkoxyamine of Example 2:

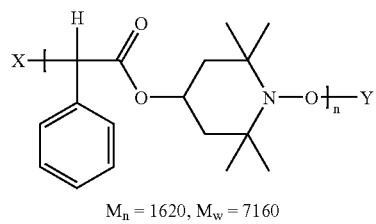

$M_n = 1620, M_w = 7160$

Reinitiation of the Styrene Polymer and Formation of a Copolymer with Styrene/Acrylonitrile:

Reinitiation with the polymer formed under a):

5.0 g of the polystyrene formed under a) are added to a mixture of 22.5 g styrene and 7.5 g acrylonitrile and stirred under Argon at 110° C. for 6 hours in a 200 ml-autoklave from Büchi Inc. the residual monomers are removed under vacuum at 40° C. 51.3% copolymer are yielded with $M_n$=77900 and $M_w$=36500.

Reinitiation with the polymer formed under b):

The same procedure is carried out as described under a). 5.0 g of the polystyrene formed under b) yielded 52.1% of a copolymer with $M_n$=142500 and $M_w$=269100.

Reinitiation with the polymer formed under c):

The same procedure is carried out as described under a). 5.0 g of the polystyrene formed under c) yielded 37.5% of a copolymer with $M_n=167300$ and $M_w=328900$.

The invention claimed is:

1. A process for the preparation of a polymeric alkoxyamine by atom transfer radical addition polymerization (ATRA) comprising the steps
   a) reacting a mono nitroxide of formula (A) X-Ln-NO. (A); or
   b) reacting a bis nitroxide of formula (B) .ON-Ln-NO. (B) with a bis-functional compound of formula (C) X-Lh-X (C); or
   c) reacting a polynitroxide of formula (D) Ln-[NO.]$_n$ (D) with a poly-functional compound of formula (E) Lh-[X]$_n$ (E);
   in the presence of a transition metal or transition metal salt in its lower oxidation state and optionally a ligand, capable of complexing the transition metal or transition metal salt;
   wherein
   X is halogen or —SCN;
   Ln is a n valent spacer group connecting the nitroxide group with the group X or with the other nitroxide groups;
   Lh is a n valent spacer group connecting the groups X and
   n is a number from 3 to 6.

2. A process according to claim 1 wherein the ligand is present and is of formula III

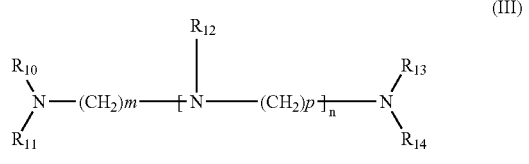

wherein $R_{10}$, $R_{11}$, $R_{13}$ and $R_{14}$ are independently H, $C_1$-$C_{12}$alkyl, $C_5$-$C_{12}$cycloalkyl or aryl;
$R_{12}$ is H, $C_1$-$C_{12}$alkyl, $C_5$-$C_{12}$cycloalkyl or aryl or a group —(CH$_2$)q-NR$_{10}$R$_{11}$;
m, p and q are numbers from 1-4; and
n is a number from 0 to 4; or
the ligand is a bicyclic or polyciclic heteroaliphatic ring.

3. A process according to claim 1 wherein the ligand is present and is selected from the group consisting of tris[2-(dimethylamino)ethyl]amine, N,N,N',N',N"-pentamethyldiethylenetriamine, N,N,N',N'-tetramethylethylenediamine, 1,1,4,7,10,10-hexamethyltriethylenetetramine, 1,4,7-trimethyl-1,4,7-triazacyclononane, 1,5,9-trimethyl-1,5,9-triazacyclododecane, 1,4,8,11-etramethyl-1,4,8,11-tetraazacyclotetradecane, 2,2'-bipyridyl, 2,2'-bi(4-t-butyl)pyridyl and 2,2',2"-terpyridyl.

4. A process according to claim 1 wherein the molar ratio between the transition metal or transition metal salt in its lower oxidation state and the halogen or —SCN containing compound is from 1:1 to 1:3.

5. A process according to claim 1 wherein the transition metal is selected from the group consisting of Cu, Fe, Mn, Mo, Cr, Ni and Ru and the transition metal salt in its lower oxidation state is a halogenide, sulfate, nitrate, carboxylate or trifluormethane sulfonate of these metals.

6. A process according to claim 1 wherein the ligand is present and the molar ratio between the ligand and the transition metal or transition metal salt in its lower oxidation state is from 0.5:1 to 1:5.

7. A process according to claim 1 wherein the polymerization temperature is from −20° C. to 100° C.

8. A process according to claim 1 wherein
   a) the mono nitroxide of formula (A) is of formula (Ia), (Ib) or Ic),

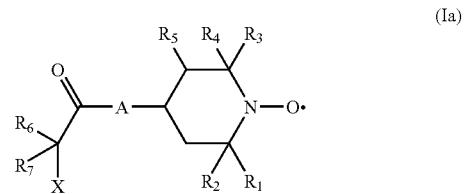

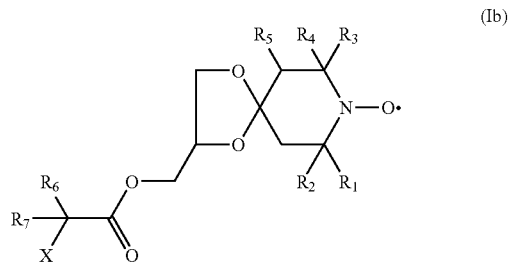

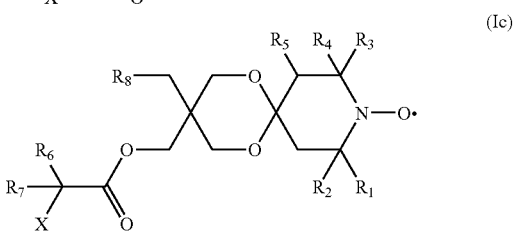

b) the bis nitroxide of formula (B) is of formula (IIa), (IIb), (IIc) or (IId),

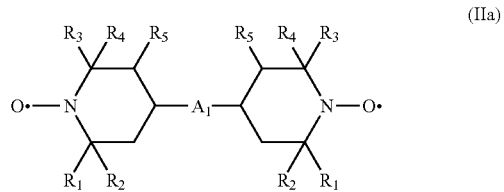

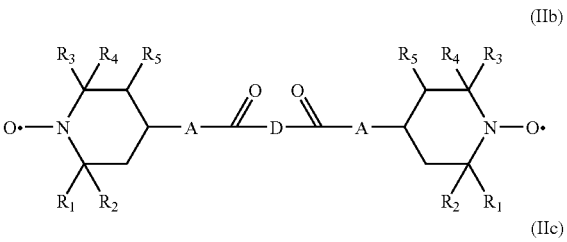

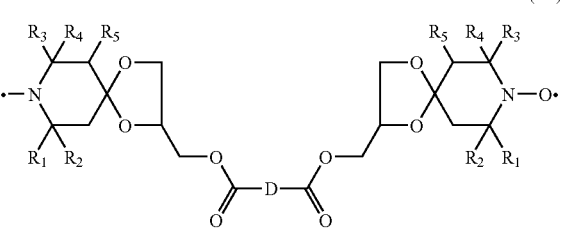

-continued

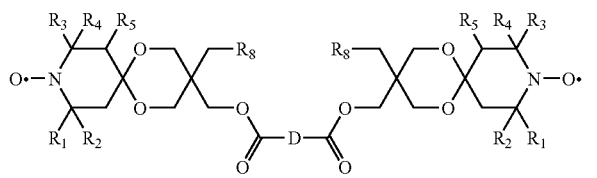
(IId)

the compound of formula (C) is of formula (III),

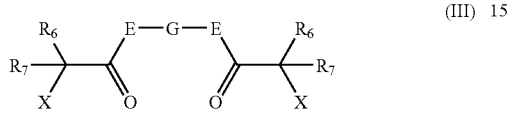
(III)

c) the polynitroxide of formula D is of formula (IVa), (IVb) or (IVc) and

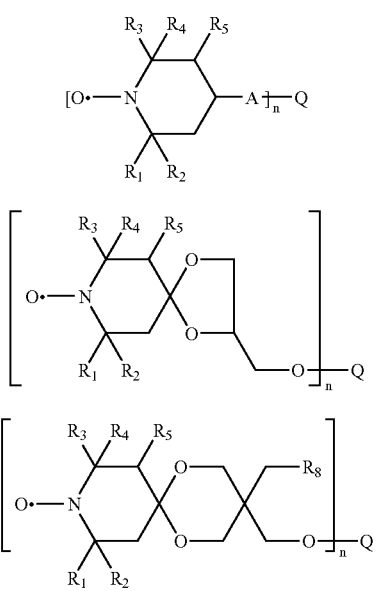
(IVa)
(IVb)
(IVc)

the compound of formula (E) is of formula (V)

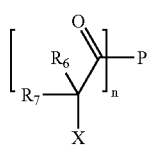
(V)

wherein
$R_1$, $R_2$, $R_3$ and $R_4$ are methyl or ethyl; or
$R_1$ and $R_2$ and/or $R_3$ and $R_4$ together with the carbon atom to which they are bonded form a $C_5$-$C_8$cycloalkyl ring:
$R_5$ is H or methyl;

$R_6$ and $R_7$ are H, $C_1$-$C_8$-alkyl or aryl;
$R_8$ is H or methyl;
X is halogen or —SCN;
A is O or $NR_9$ wherein $R_9$ is H or $C_1$-$C_{18}$alkyl, $C_5$-$C_{12}$cycloalkyl or aryl;
$A_1$ is a group —$NR_9$—$(CH_2)_a$—$NR_9$— wherein a is a number from 2 to 12 or a group

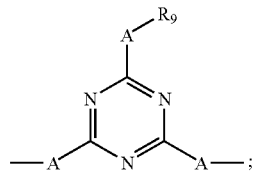

D is a direct bond or $C_1$-$C_{12}$alkylene, $C_5$-$C_{12}$cycloalkylene or arylene, wherein the alkylene and cycloalkylene may be interrupted by one or more O, S or N atoms;
E is a direct bond, O or $NR_9$;
G is $C_1$-$C_{12}$alkylene, $C_5$-$C_{12}$cycloalkylene or arylene wherein the alkylene and cycloalkylene may be interrupted by one or more O, S or N atoms;
n is 3 or 4;
Q is the acyl residue of a trivalent or tetravalent carboxylic acid; and
P is the residue of a trivalent or tetravalent alcohol.

9. A process according to claim 8 comprising reacting a mono nitroxide of formula (Ia), (Ib) or (Ic).

10. A process according to claim 9 where in the compounds of formula (Ia), (Ib) or (Ic);
$R_1$, $R_2$, $R_3$ and $R_4$ are methyl;
$R_5$ is H;
$R_6$ and $R_7$ are independently H or methyl;
$R_8$ is H or methyl;
X is Cl or Br; and
A is O or $NR_9$ and $R_9$ is H or $C_1$-$C_{18}$alkyl.

11. A process according to claim 10 comprising reacting a mono nitroxide of formula (Ia).

12. A stabilized composition which comprises
an organic material subject to degradation by heat, light or oxygen and
a polymeric alkoxyamine obtained by a process according to claim 1.

13. A composition according to claim 12 wherein the organic material is a natural or synthetic polymer.

14. A composition which comprises
an organic material subject to degradation by heat, light or oxygen,
a polymeric alkoxyamine obtained by a process according to claim 1 and
at least one coadditive stabilizer selected from the group consisting of the phenolic antioxidants, metal stearates, metal oxides, organophosphorus compounds, furanone antioxidants, hydroxylamines, UV absorbers, hindered amine stabilizers different from that obtained according to the process of claim 1 and mixtures thereof.

* * * * *